March 1, 1927. Re. 16,566

E. S. WARD

BATHING SHOE

Original Filed July 25, 1925

Inventor

EDNA SANGUINET WARD.

by [illegible]

Att'ys

Reissued Mar. 1, 1927. Re. 16,566

UNITED STATES PATENT OFFICE.

EDNA SANGUINET WARD, OF FORT WORTH, TEXAS.

BATHING SHOE.

Original No. 1,593,889, dated July 27, 1926, Serial No. 45,999, filed July 25, 1925. Application for reissue filed October 27, 1926. Serial No. 144,635.

My invention relates to shoes or sandals and more particularly to shoes for bathing purposes; and an important object is to provide shoes or sandals adapted for use in either fresh or salt water bathing, and which may be worn with comfort on the beach or at other places and which will not be affected by the water whether fresh or salt, the feet being protected under all conditions. Another important object of the invention is to produce shoes or sandals of the class described, which are neat, stylish, and attractive in appearance. Other objects and advantages will appear upon consideration of the following description, and the invention will be more particularly pointed out in the claims.

Reference is had to the accompanying drawings which form a part of this application.

Figure 1:
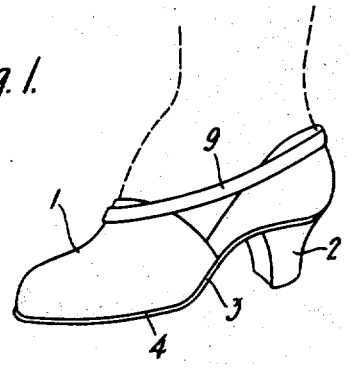
Figure 2:
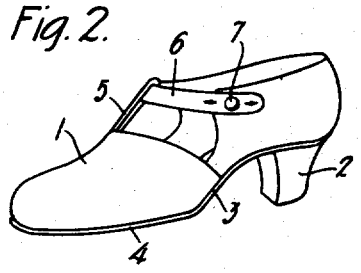
Figure 3:
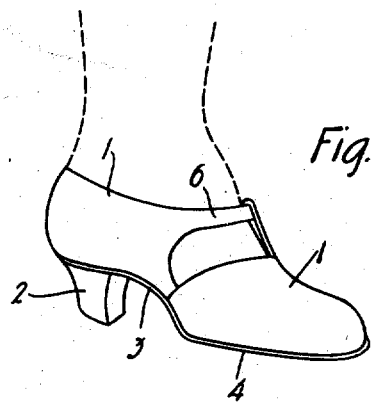
Figure 4:
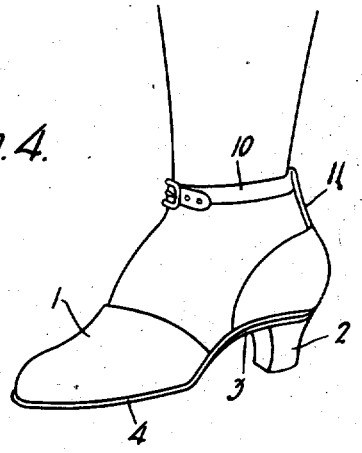

Fig. 1 is a perspective view of one form of a shoe constructed in accordance with my invention. Fig. 2 is a perspective view of a shoe which is a slight variation from the shoe shown in Fig. 1. Fig. 3 is a perspective view of the opposite side of the shoe shown in Fig. 2. Fig. 4 is a perspective view of another style of shoe.

Similar characters of reference are used to indicate the same parts throughout the several views.

The improved shoe is constructed generally of rubber or of material having the characteristics of rubber, the principal aim being to produce a shoe which is not only attractive in appearance and comfortable to the foot but will not be injured by exposure to either fresh or salt water, and to produce a shoe that can be worn with comfort in or out of the water. A person needs shoes for wearing on the beach as well as in the water and which will be neat and stylish in appearance. An essential feature of the invention is that the shoes or sandals made in accordance therewith be waterproof at the surface thereof both inside and outside of the shoe to protect the material back of such surface.

The upper part 1, which may be referred to as the body portion or upper of the shoe, is preferably made principally of rubber or similar material and of such material as will be durable and comfortable to the wearer. The heel 2 is made preferably of harder or vulcanized rubber or fibre or cork impregnated with rubber. The arch 3 may also be made of stiff or stiffened rubber and of such firm character that it will maintain its form and support the foot, and said arch may be formed integral with the heel 2. The other part of the shoe sole 4 must be of softer or more flexible material sufficiently yielding to be comfortable to the foot. The part 4 of the sole may be flexible, connected in a waterproof manner, as by vulcanizing, to the arch member 3. The other part 1 is attached to, as by vulcanizing, or made integral with the sole 4 and arch members 3, thus making the entire shoe a substantially integral structure of materials of different strength of flexibility. The retaining straps may also be made integral with the upper members 1. In Fig. 2, the tab 5 is formed on the upper member 1 and is provided with a loop for receiving a retaining strap 6 which is formed on the rear portion of the upper member 1. The strap 6 may be fastened by a button 7 as shown in Fig. 2 and the strap may have a plurality of button holes so that the strap may be adjusted to different sized feet. In the form of strap shown in Figs. 2 and 3, the strap 6 pulls on the arched part of the shoe and on the rear portion of the upper member 1. The form of strap 9, shown in Fig. 1, is formed on the extreme rear portion of the member 1 and may be fastened in front similarly to the fastening shown in Figs. 2 and 3. In the form of strap 10, shown in Fig. 4, the strap is run through an integral tab 11 and fastened in front by a buckle or otherwise.

It will be evident that, in carrying out the present invention, well known manufacturing practices may be followed as far as practicable.

It is apparent that other waterproof material may be used for making the shoes and that the shape and style of the shoes or sandals may be varied, without departing from the true spirit and scope of my invention. Fibre or cork may be used and such material may be impregnated or covered with rubber or rubber cement or other waterproofing material.

What I claim is:—

1. A shoe for bathing purposes comprising a body member of soft waterproof material, a sole of harder waterproof material vulcanized to said body, and a combined arch and heel of hard rubber vulcanized to said sole and body.

2. A shoe for the use of bathers comprising a combined heel and arch of hardened rubber formed to conform to the contour of the wearer's foot, a sole of softer rubber vulcanized to said arch and heel, and a body formed of soft rubber and vulcanized to said sole and arch.

3. A shoe for bathing purposes comprising a body portion including an outer surface of soft waterproof material, a stiffer waterproof sole attached to said body portion by waterproof material, and a relatively stiff and waterproof combined arch and relatively high heel attached to said body portion and sole by waterproof material.

4. A shoe for bathing purposes, comprising a waterproof body portion having a surface of rubber material, a stiffer waterproof sole having a rubber surface and being vulcanized to said body portion, and a relatively stiff arch and heel having a surface of rubber material and being vulcanized to said sole and body.

5. A waterproof shoe for bathing purposes comprising a body member of soft waterproof material, a sole of harder waterproof material having a waterproof connection with said body, and a combined arch and relatively high heel of hard rubber having a waterproof connection with said body.

6. A shoe for bathing purposes comprising a body portion having an upper of flexible waterproof material, a stiffer waterproof sole having a waterproof connection with said body, and a relatively stiff and waterproof combined arch and relatively high heel having a waterproof connection with said body portion and sole.

7. A shoe for bathing purposes comprising a waterproof upper of flexible waterproof material, and a waterproof combined sole and relatively stiff arch and relatively high heel, having a waterproof attachment with said upper.

In witness whereof I affix my signature.

EDNA SANGUINET WARD.